(12) United States Patent
Propheter-Hinckley et al.

(10) Patent No.: US 11,092,017 B2
(45) Date of Patent: Aug. 17, 2021

(54) MINI CORE PASSAGE WITH PROTRUSION

(71) Applicant: United Technologies Corporation, Farmington, CT (US)

(72) Inventors: Tracy A. Propheter-Hinckley, Rocky Hill, CT (US); Allan N. Arisi, Manchester, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 30 days.

(21) Appl. No.: 16/594,156

(22) Filed: Oct. 7, 2019

(65) Prior Publication Data

US 2020/0149411 A1    May 14, 2020

Related U.S. Application Data

(60) Provisional application No. 62/757,940, filed on Nov. 9, 2018.

(51) Int. Cl.
  *F01D 5/18*   (2006.01)
  *F01D 5/14*   (2006.01)
  *F01D 25/12*  (2006.01)

(52) U.S. Cl.
  CPC ............ *F01D 5/187* (2013.01); *F01D 5/141* (2013.01); *F01D 25/12* (2013.01); *F05D 2220/32* (2013.01); *F05D 2260/2214* (2013.01)

(58) Field of Classification Search
  CPC . F01D 5/141; F01D 5/18; F01D 5/186; F01D 5/187; F01D 5/188; F01D 25/12; F05D 2220/32; F05D 2260/2212; F05D 2260/2214; F05D 2260/22141
  See application file for complete search history.

(56) References Cited

U.S. PATENT DOCUMENTS

| 6,254,334 | B1 | 7/2001 | LaFleur |
| 6,514,042 | B2 | 2/2003 | Kvasnak et al. |
| 7,815,414 | B2 | 10/2010 | Devore et al. |

(Continued)

FOREIGN PATENT DOCUMENTS

| EP | 1808574 | 7/2007 |
| EP | 2022940 | 2/2009 |
| EP | 2792850 | 10/2014 |

OTHER PUBLICATIONS

European Search Report for European Patent Application No. 19208288.1 completed Mar. 25, 2020.

*Primary Examiner* — Courtney D Heinle
*Assistant Examiner* — Sang K Kim
(74) *Attorney, Agent, or Firm* — Carlson, Gaskey & Olds, P.C.

(57) ABSTRACT

An airfoil includes an airfoil wall that defines leading and trailing ends and first and second sides that join the leading and trailing ends. The airfoil wall circumscribes an internal core cavity. A cooling passage network is embedded in the airfoil wall between inner and outer portions of the airfoil wall. The cooling passage network has an inlet orifice through the inner portion of the airfoil wall to receive cooling air from the internal core cavity, a sub-passage region that includes an array of pedestals, and at least one outlet orifice through the outer portion. The outer portion of the airfoil wall has a protrusion in the cooling passage network that faces toward the inlet orifice.

18 Claims, 6 Drawing Sheets

(56) References Cited

U.S. PATENT DOCUMENTS

| | | |
|---|---|---|
| 8,414,263 B1 | 4/2013 | Liang |
| 9,476,429 B2 * | 10/2016 | Beach .................. F04D 29/002 |
| 2002/0021966 A1 * | 2/2002 | Kvasnak ................ F01D 5/187 |
| | | 416/97 R |
| 2016/0123186 A1 | 5/2016 | Stover et al. |
| 2017/0191417 A1 * | 7/2017 | Bunker .................. F01D 25/12 |
| 2019/0257206 A1 * | 8/2019 | Webster ................ F01D 5/186 |
| 2020/0011199 A1 * | 1/2020 | Varney .................. F01D 25/12 |

* cited by examiner

MINI CORE PASSAGE WITH PROTRUSION

CROSS-REFERENCE TO RELATED APPLICATION

This application claims priority to U.S. Provisional Application No. 62/757,940 filed Nov. 9, 2018.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

SUMMARY

A gas turbine engine article according to an example of the present disclosure includes an article wall that defines a cavity and a cooling passage network embedded in the article wall between inner and outer portions of the article wall. The cooling passage network has an inlet orifice through the inner portion of the airfoil wall to receive cooling air from the cavity, a sub-passage region including an array of pedestals, and at least one outlet orifice through the outer portion. The outer portion of the article wall has a protrusion in the cooling passage network facing toward the inlet orifice.

In a further embodiment of any of the foregoing embodiments, the protrusion is conical.

In a further embodiment of any of the foregoing embodiments, the inlet orifice defines an orifice central axis and the protrusion defines a protrusion central axis, and the orifice central axis and the protrusion central axis are coaxial.

In a further embodiment of any of the foregoing embodiments, the inlet orifice defines a minimum cross-sectional area and there is a bypass flow area defined between the inlet orifice and the protrusion. The bypass flow area is greater than the cross-sectional area of the inlet orifice.

In a further embodiment of any of the foregoing embodiments, the protrusion defines a protrusion central axis and includes an impingement surface that is sloped with respect to a central axis of the inlet orifice.

In a further embodiment of any of the foregoing embodiments, the outer portion of the airfoil wall includes at least one trip strip flanking the protrusion in the cooling passage network.

In a further embodiment of any of the foregoing embodiments, the at least one trip strip has a bowed shape.

In a further embodiment of any of the foregoing embodiments, the bowed shape follows a periphery of the protrusion such that there is a uniform trench there between.

In a further embodiment of any of the foregoing embodiments, the protrusion defines a protrusion height and the at least one trip strip defines a trip strip height, and the protrusion height is greater than the trip strip height.

An airfoil according to an example of the present disclosure includes an airfoil wall that defines leading and trailing ends and first and second sides that join the leading and trailing ends. The airfoil wall circumscribes an internal core cavity. There is a cooling passage network embedded in the airfoil wall between inner and outer portions of the airfoil wall. The cooling passage network has an inlet orifice through the inner portion of the airfoil wall to receive a flow cooling air from the internal core cavity, a manifold region into which the inlet orifice opens, a sub-passage region including an array of pedestals downstream of the manifold region, and at least one outlet orifice through the outer portion downstream of the sub-passage region. The outer portion of the airfoil wall has a flow splitter configured to fan the flow of cooling air from the inlet orifice into the manifold region.

In a further embodiment of any of the foregoing embodiments, the flow splitter is a protrusion on the outer portion of the airfoil wall in the cooling passage network.

In a further embodiment of any of the foregoing embodiments, the flow splitter includes an impingement surface that is sloped with respect to a central axis of the inlet orifice.

In a further embodiment of any of the foregoing embodiments, the flow splitter is configured to fan the flow of cooling air over a 360° swath.

In a further embodiment of any of the foregoing embodiments, the flow splitter is faceted.

In a further embodiment of any of the foregoing embodiments, the flow splitter is configured to fan a portion of the flow of cooling air in an axially forward direction toward the leading end.

A gas turbine engine according to an example of the present disclosure includes a compressor section, a combustor in fluid communication with the compressor section, and a turbine section in fluid communication with the combustor. The turbine section has a turbine airfoil that includes a gas turbine engine article according to any of the foregoing embodiments.

In a further embodiment of any of the foregoing embodiments, the protrusion is conical.

In a further embodiment of any of the foregoing embodiments, the inlet orifice defines an orifice central axis and the protrusion defines a protrusion central axis, and the orifice central axis and the protrusion central axis are coaxial.

In a further embodiment of any of the foregoing embodiments, the inlet orifice defines a minimum cross-sectional area and there is a bypass flow area defined between the inlet orifice and the protrusion. The bypass flow area being greater than the cross-sectional area of the inlet orifice.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
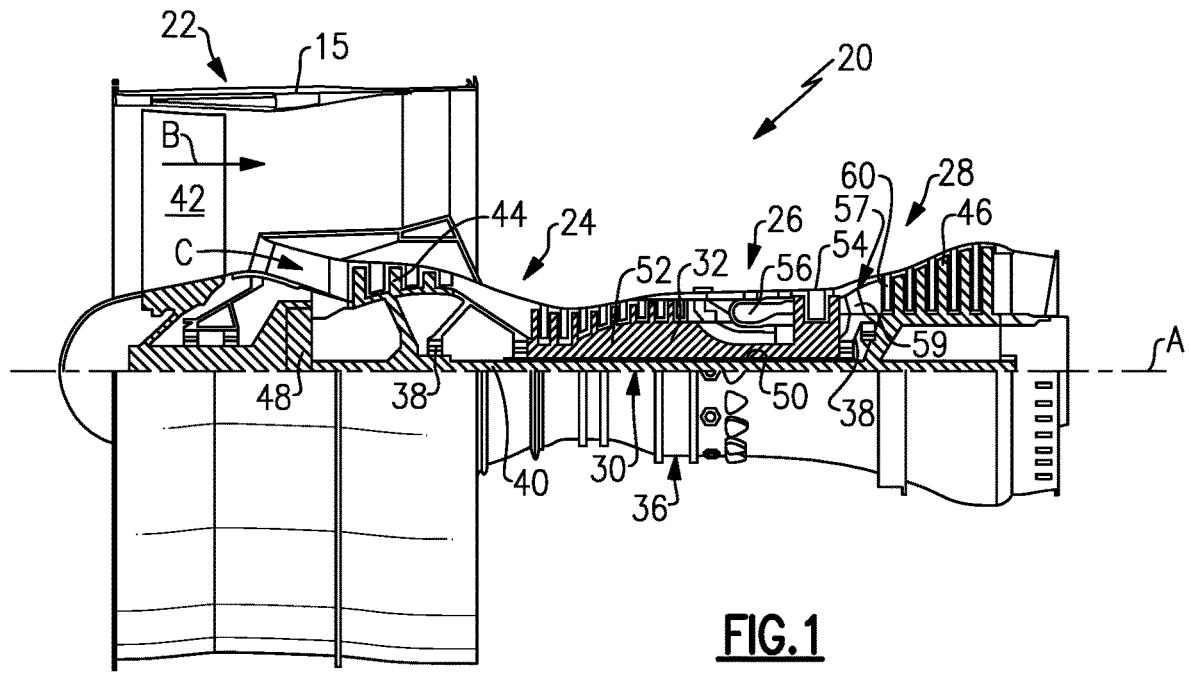
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
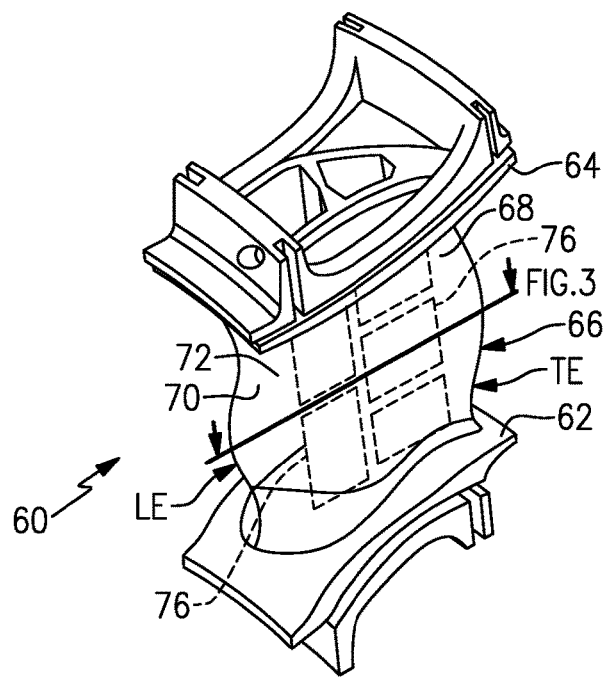
FIG. 2 illustrates an example airfoil of the gas turbine engine.

FIG. 2 illustrates a representative example of a gas turbine engine article, namely a turbine airfoil 60 used in the turbine engine 20 (see also FIG. 1). As shown, the turbine airfoil 60 is a turbine vane; however, it is to be understood that, although the examples herein may be described with reference to the turbine vane, this disclosure is also applicable to turbine blades, blade outer air seals and combustor panels. The turbine airfoil 60 is also shown in a cross-sectioned view in FIG. 3.

Figure 3:
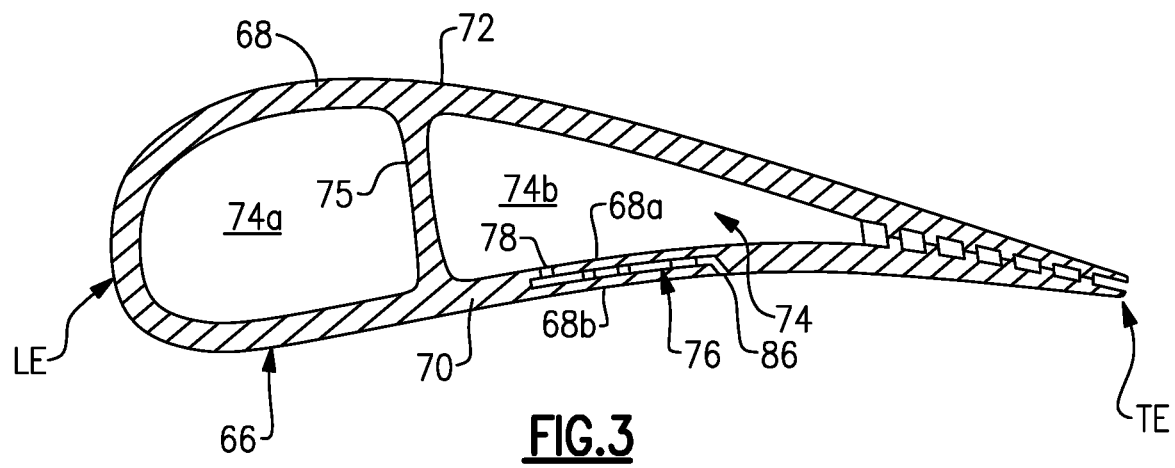
FIG. 3 illustrates a sectioned view of the airfoil.

Referring to FIGS. 2 and 3, the turbine airfoil 60 includes an inner platform 62, an outer platform 64, and an airfoil section 66 that spans between the inner and outer platforms 62/64. The airfoil section 66 includes an airfoil outer wall 68 that delimits the profile of the airfoil section 66. The outer wall 68 defines a leading end (LE), a trailing end (TE), and first and second sides 70/72 that join the leading and trailing ends. In this example, the first side 70 is a pressure side and the second side 72 is a suction side. The outer wall 68 circumscribes an internal core cavity 74, which in this example is partitioned by a rib 75 into a forward core cavity 74a and an aft core cavity 74b. As will be appreciated, there may alternatively be only a single core cavity or there may be additional ribs to partition additional core cavities.

There is at least one cooling passage network 76 embedded in the airfoil outer wall 68 between inner and outer portions 68a/68b of the airfoil wall 68. For example, as shown (FIG. 3) one or more of the cooling passage networks 76 is embedded in the second side 72 of the outer wall 68, although one or more networks 76 could additionally or alternatively be embedded in the first side 70. The cooling passage networks 76 may also be referred to as minicores or minicore passages. A "minicore" or "minicore passage" is a reference to the small investment casting core that is typically used to make such an embedded passage, as opposed to a main core that is used to form a main or central core cavity in an airfoil.

Figure 4:
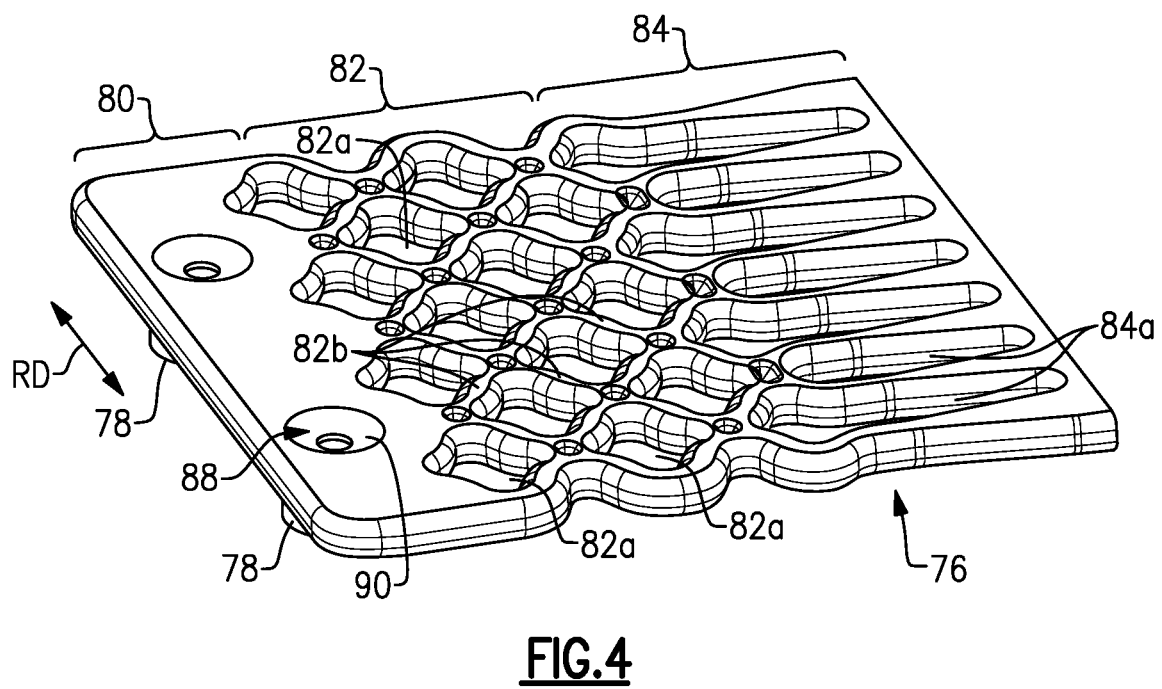
FIG. 4 illustrates an "inverse" or negative view of a cooling passage network of the airfoil of FIG. 3.

FIG. 4 shows an "inverse" or negative view of a representative one of the cooling passage networks 76. The inverse view is also representative of an investment core that may be used in an investment casting process to form the network 76 in the airfoil 60. Most typically, the investment casting core is injection molded from a material that contains ceramic or metal alloy. The investment core is shaped to form the cooling passage network 76. In the inverse view, solid structures of the investment core produce void structures in the cooling passage network 76 and void structures of the investment core produce solid structures in the cooling passage network 76. Thus, the investment core has the negative of the structural features of the cooling passage network 76. It is to be understood that although the inverse views presented herein may be used to describe features of the network 76, each negative view also represents an investment core and a corresponding cavity in a molding tool that is operable to mold the investment core.

The cooling passage network 76 includes at least one inlet orifice 78 through the inner portion 68a of the airfoil outer wall 68 (FIG. 3) to receive cooling air from the internal core cavity 74. The inlet orifice 78 may be round and/or rectangular/racetrack and sized to achieve proper flow characteristics in the network 76. Most typically, the network 76 will include two inlet orifices 78. A single, exclusive inlet orifice 78 is also contemplated, as well as more than two inlet orifices 78, although fabrication may be challenging.

The inlet orifices 78 open into a radially-elongated manifold region 80 (see FIG. 4, radial direction RD), which serves to distribute the cooling air to a downstream sub-passage region 82, which then leads into an exit region 84 that feeds into one or more outlet orifices 86 (FIG. 3) through the outer portion 68b of the airfoil wall 68. In this example, the exit region 84 includes a plurality of flow guides 84a. For instance, the flow guides 84a have a teardrop shape and facilitate straightening and guiding flow into the one or more outlet orifices 86. In general, the inlet orifices 78 of the network 76 are located forward of the one or more outlet orifices 86.

One of the inlet orifices 78 is located in the radially upper half of the manifold region 80 and the other of the inlet orifices 78 is in the radially lower half of the manifold region 80. Most typically, the radially upper and lower halves of the network 76 are mirror images, i.e., symmetric relative to the midline of the network 76 between the two inlet orifices 78.

In this example, the sub-passage region 82 includes an array of pedestals 82a. The pedestals 82a are arranged in radial rows that extend in the radial direction RD in the airfoil 60, which is perpendicular to the engine axis A. The rows are radially offset from each other and the pedestals 82a of the rows are interleaved so as to define sub-passages 82b there between. The size and shape of the pedestals 82a and subsequent sub-passages between the pedestals 82a may be determined depending on the desired flow/pressure loss across the network 76 and heat transfer by the cooling air. The pedestals 82a as shown have a lobed-diamond cross-sectional geometry in which each of the faces of the diamond are concave such that the tips of the diamond form rounded projections, i.e., a lobes. It is to be understood, however, that the pedestals 82a may alternatively be, but are not limit to, diamond or other polygonal shape, round, oval, or elliptical.

During operation of the engine 20, cooling air, such as bleed air from the compressor section 24, is fed into the internal core cavity 74. The cooling air from the core cavity 74 flows into the cooling passage network 76 to cool the outer wall 68. The cooling air enters the cooling passage network 76 through the one or more inlet orifices 78 into the manifold region 80. The cooling air then turns within the manifold region 80 and flows into and through the sub-passage region 82, through the exit region 84, and out the one or more outlet orifices 86 to provide surface film cooling on the exterior surface of the airfoil section 66.

Figure 5:
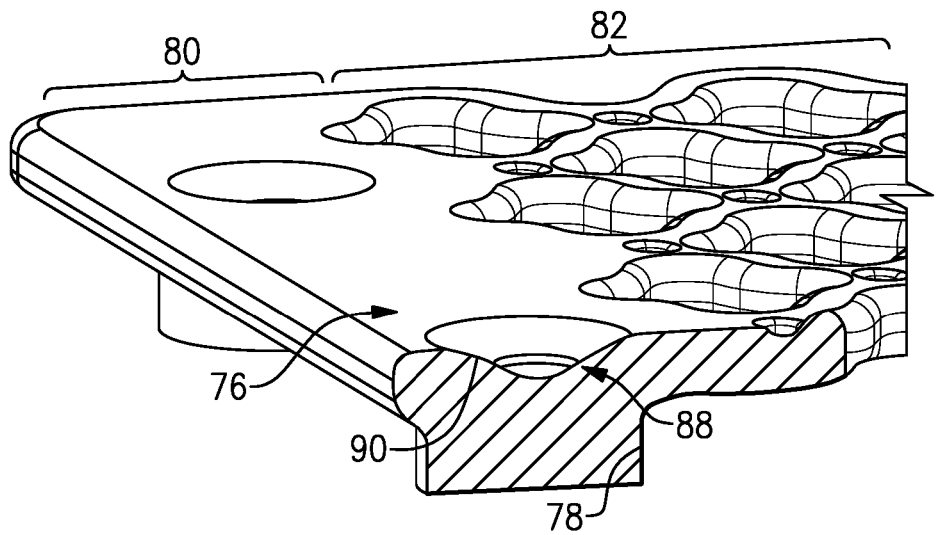
FIG. 5 illustrates a partially sectioned view of the cooling passage network represented in FIG. 4.
Figure 6:
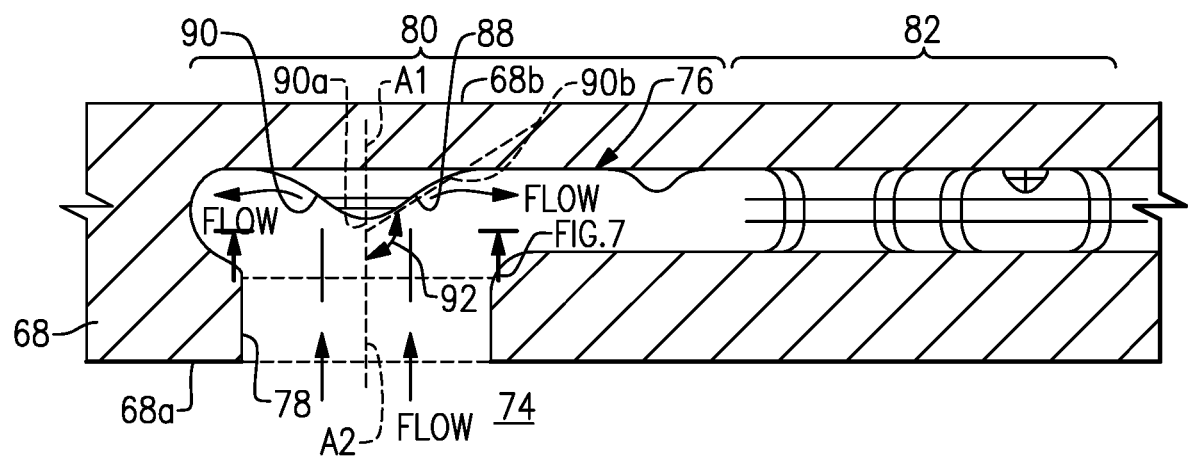
FIG. 6 illustrates a sectioned view showing selected portions of the cooling passage network represented in FIGS. 4 and 5.

FIGS. 5 and 6 show additional sectioned views of the network 76. FIG. 5 is the "inverse" or negative view of a select sectioned portion of the network 76 through one of the inlet orifices 78, while FIG. 6 is a sectioned view through the outer wall 68. It is to be appreciated that although views through only one of the inlet orifices 78 are shown, that a sectioning through the other inlet orifice 78 would be identical.

Flow of cooling air through an inlet orifice and subsequent turning or deflection of the flow toward downstream structures requires that the cooling air impinge onto a surface that turns or deflects the cooling air. In a typical minicore passage, such a surface lies substantially perpendicular to the direction of flow and the flow therefore impinges directly against the surface. With the force of direct impingement, dirt or other debris that is entrained in the flow of cooling air can adhere to the surface. Accumulation and build-up of dirt or debris on the impingement wall opposite the inlet orifice may lead to plugging or reduced flow into a minicore passage.

To mitigate or reduce dirt accumulation and build up on the impingement wall across from the inlet, the cooling passage network 76 includes a flow splitter 88 located on the inside surface of the outer portion 68b of the outer wall 68 opposite the inlet orifice 78. The flow splitter 88 faces toward the inlet orifice 78 and includes one or more impingement surfaces 90 onto which the flow of cooling air is received from the inlet orifice 78. The impingement surface 90 may protrude into the passage 76 and along the axis of the inlet flow A2. The impingement surface 90 presents an oblique surface for the incoming flow and its entrained debris or particulate. Such an oblique angle increases the coefficient of restitution of particles entrained in the inlet flow impinging on the flow splitter 88, thereby reducing dirt adherence and buildup. In this example, the flow splitter 88 is a protrusion on the outer portion 68b that faces toward the inlet orifice 78. The protrusion may be aligned with the inlet orifice 78 so that all or a substantial portion of the cooling air that flows in through the inlet orifice 78 is received onto the protrusion.

The flow of cooling air from the inlet orifice 78 impinges upon the impingement surfaces 90 of the flow splitter 88.

Figure 7:
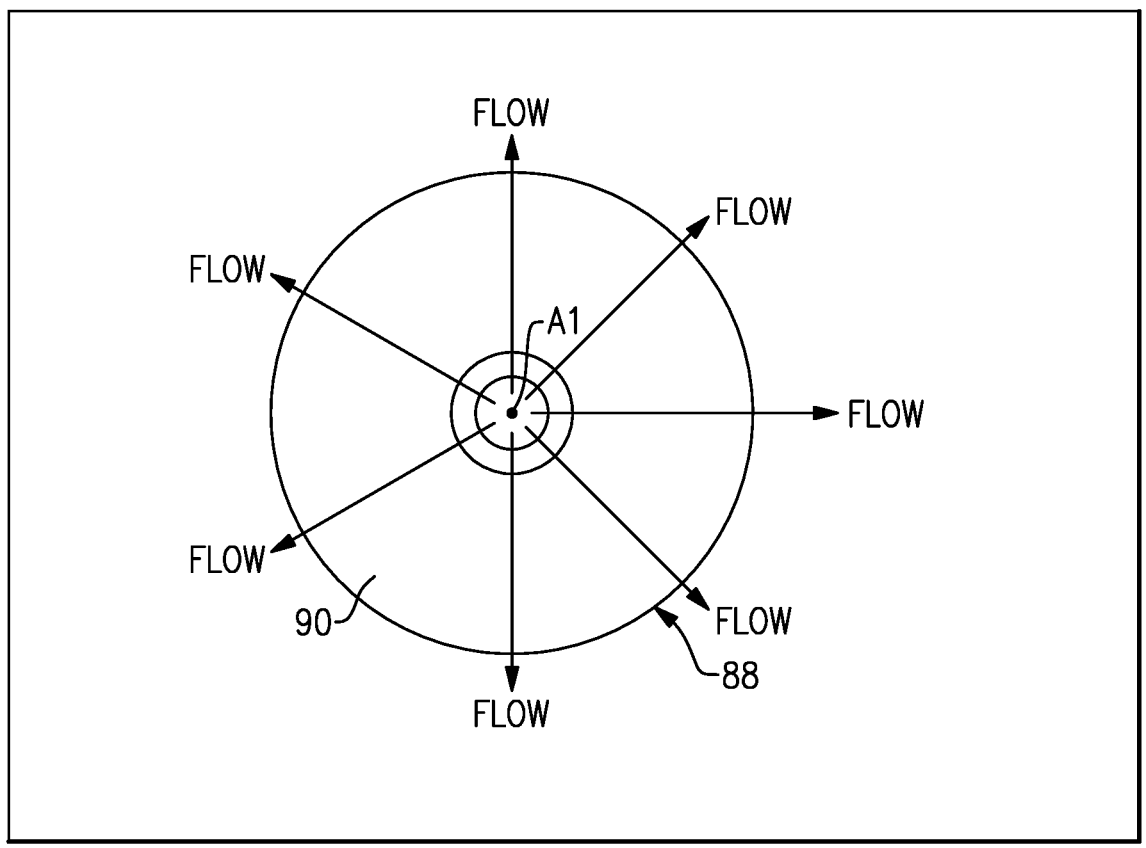
FIG. 7 illustrates a top-down view onto a flow splitter in the cooling passage network.

The impingement surfaces 90 divides and deflects the flow, fanning (i.e., spreading) the flow laterally within the manifold region 80, as depicted in the top-down view of the flow splitter 88 in FIG. 7. For example, the flow splitter 88 fans the flow of cooling air over a 360° swath around the central protrusion axis A1. In this case, a portion of the cooling air is deflected in the aft direction, toward the sub-passage region 82, while other portions of the cooling airflow are deflected forward, toward a leading edge side of the network 76, and in the radial direction RD.

The flow splitter 88 in this example has a generally conical shape that defines an apex or tip 90a and sloped sides 90b. As an example, the shape of the flow splitter 88 is regular, i.e., symmetrical, and defines a central protrusion axis A1. In a further example, the flow splitter 88 is aligned with the inlet orifice 78. For instance, the inlet orifice 78 defines a central orifice axis A, and the central protrusion axis A is coaxial with the central orifice axis A2. The shape and size of the flow splitter 88 also corresponds to the shape and size of the inlet orifice 78. For instance, for a circular inlet orifice 78 the flow splitter 88 would have a circular component, such as a conical shape, or for a polygonal inlet orifice 78, the flow splitter 88 would have a polygonal component, such as a pyramid shape.

The sloped sides 90b are sloped at an oblique angle relative to the central protrusion axis A1. The angle is represented in FIG. 6 at 92. For instance, the oblique angle is the angle in the cooling passage network 76 subtended by the central protrusion axis A1 and a line tangent to the sloped sides 90b. The angle may be varied for different modified designs of the network 76, depending on the inlet flow characteristics and debri/particulate sizes in order to optimize the coefficient of restitution thereby reducing dirt accumulation on the wall opposite the inlet orifice. As an example, the angle 92 may be greater than 90°. While angles 92 that are only modestly above 90° may facilitate dirt/debris avoidance, most typically the angle 92 will be larger and greater than or equal to 100°. In a further example, the angle 82 is no greater than 165°. The sloped sides 90b with the oblique angle 92 provide a smooth turning of the flow of cooling air, which facilitates avoidance of direct impingement that can otherwise increase the potential for adherence of dirt/debris.

Figure 8:
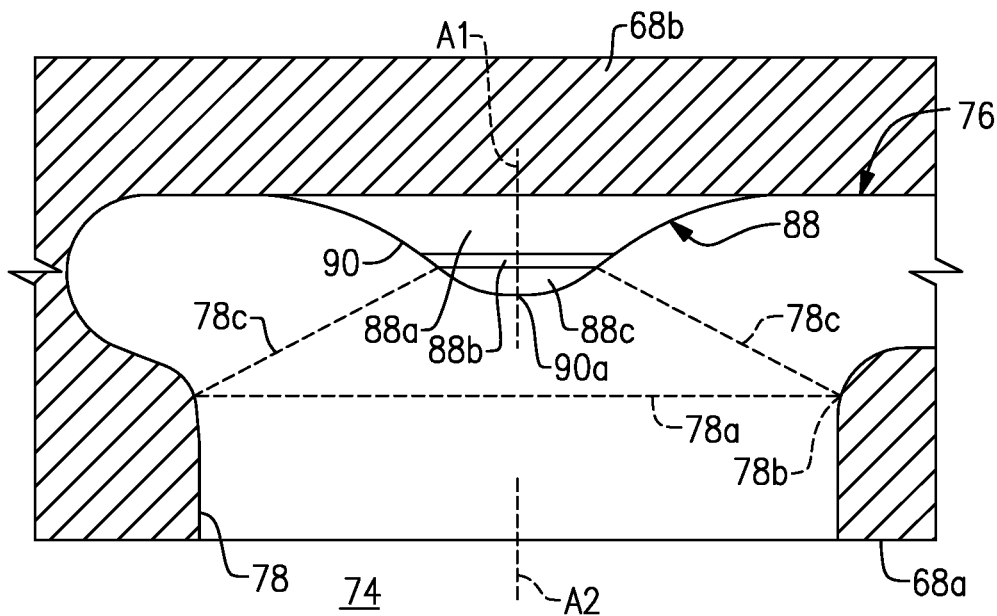
FIG. 8 illustrates a magnified sectioned view of a portion of a cooling passage network.

Referring to FIG. 8, which shows a magnified view of the inlet orifice 78 and flow splitter 88, the flow splitter 88 is faceted and includes facet surfaces 88a, 88b, and 88c. The facet surfaces 88a, 88b, and 88c serve as the impingement surfaces 90 and have different geometries, such as different angles 92 and different contours (e.g., convex, concave, flat, etc.). The facet surfaces 88a, 88b, and 88c facilitate a smooth dividing and fanning of the flow of cooling air from the inlet orifice 78. The facet surfaces 88a, 88b, and 88c may also aid in manufacturability to enable molding of the corresponding shape of the flow splitter 88 in the investment core. As will be appreciated, the sloped sides 90b and facet surfaces 88a, 88b, and 88c may be flat, concave, convex, or combinations of concave, convex, and flat in order to provide smooth dividing and fanning of the flow avoidance of dirt/debris accumulation.

The flow splitter 88 can further be configured to vary, or reduce, obstruction of flow into the network 76. For instance, if the flow splitter 88 were greatly enlarged it could constrict flow into the network 76 and thereby alter cooling performance. To reduce obstruction, the flow splitter is configured with respect to the size of the inlet orifice 78. For instance, the inlet orifice 78 has a cross-sectional area, which is represented at 78a in FIG. 8. For a straight inlet orifice like inlet orifice 78, the cross-sectional area 78a may be taken at a mouth 78b, which is at the breakpoint edge of the inlet orifice 78a where the inlet orifice begins to flare outwards into the manifold region 80. Alternatively, if the inlet orifice 78 were instead tapered or otherwise varied in its cross-section along its axial length, the cross-sectional area would be taken at the minimum cross-sectional area.

There is a minimum distance, represented at 78c, between the nearest points on the flow splitter 88 and inlet orifice 78. In this example, the nearest points are shown to be between the mouth 78b and facet surface 88b. As will be appreciated, the locations of the nearest points may vary depending on the shape of the inlet orifice 78 and shape of the flow splitter 88. The distance 78c, when swept around the central orifice axis A2, represents a bypass area that is available for flow past the splitter 88. In the example, the bypass area 78c is equal to or greater than the cross-sectional area 78a of the inlet orifice 78. Because the bypass area 78c is equal to or greater than the cross-sectional area 78a of the inlet orifice 78, the flow splitter 88 does not constrict flow of the cooling air from the inlet orifice 78 past the protrusion.

Figure 9:
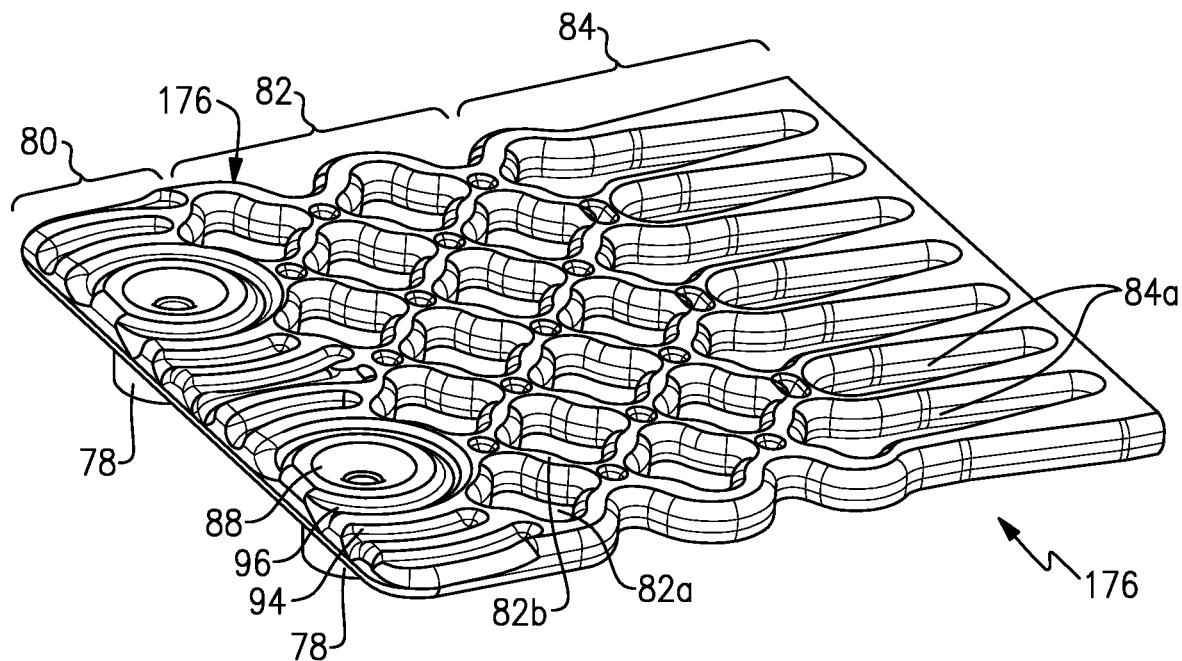
FIG. 9 illustrates an "inverse" or negative view of a cooling passage network that has trip strips.
Figure 10:
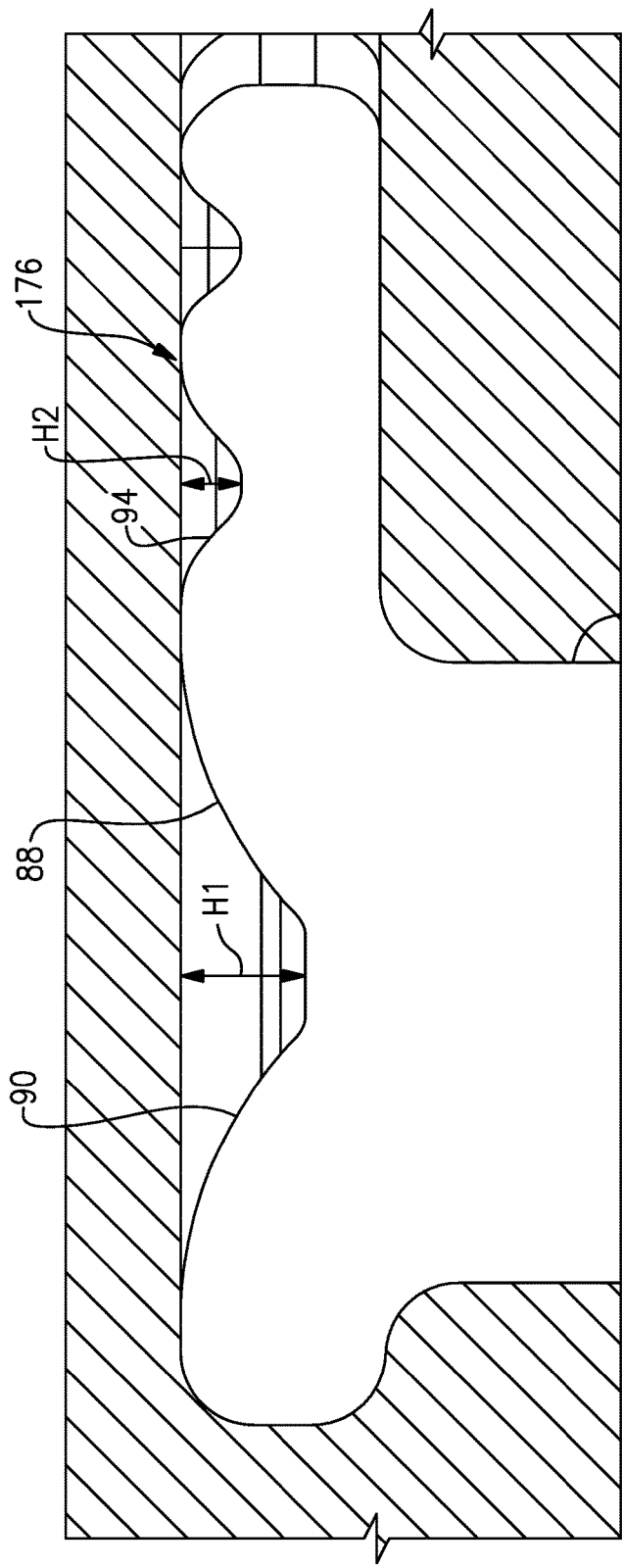
FIG. 10 illustrates a sectioned view of selected portions of the cooling passage network represented in FIG. 9.

FIGS. 9 and 10 show another example of a cooling passage network 176 that is similar to the cooling passage 76 but additionally includes one or more trip strips 94 that flank the flow splitter 88. For example, as shown in FIG. 9, the trip strips 94 have a bowed shape and generally follow the peripheral shape of the flow splitter 88. For instance, the trip strip 94 is semi-circular such that there is a uniform trench 96 between the trip strip 94 and the edge of the flow splitter 88. The trip strips 94 are generally smaller than the flow splitter 88. For example, the flow splitter 88 defines a protrusion height H1 and the trip strip 94 defines a trip strip height H2, and H1 is greater than H2. In a further example, H1 is greater than H2 by at least 110% and in further examples is greater than H2 by 150% or more.

The trip strips 94 facilitate mixing and turbulence of the cooling air that enters into the network 176 as well as increasing the convective surface area in the network 176. The flow splitter 88 opposite the inlet orifice 78 guides the cooling air from the inlet orifice 78 into the trench 96, thereby forcing the cooling air to then flow over the trip strips 94 in order to advance to the sub-passage region 82.

Figure 11:
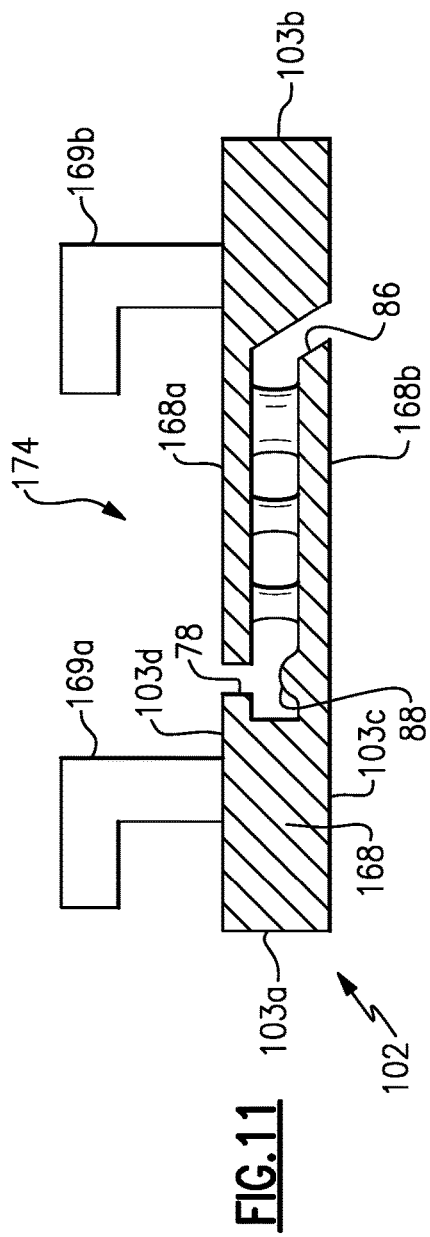
FIG. 11 illustrates an example blade outer air seal that has a cooling passage network.

FIG. 11 illustrates another example gas turbine engine article 102, namely a blade outer air seal 103. The blade outer air seal 103 is an arc segment that is mounted in the engine 20 with like seals 103 to form an annular seal around the tips of the turbine blades. In this example, the cooling passage network 76 is employed in the blade outer air seal 103. It is to be understood that although the blade outer air seal 103 is shown with network 76, that the blade outer air seal 103 may alternatively employ any of the example networks 176 and features described or shown herein. In this example, the blade outer air seal 103 includes an article wall 168. The wall 168 defines a leading end 103a, a trailing end 103b, a gaspath side 103c, and a non-gaspath side 103d. The gaspath side 103c faces toward the core gaspath of the engine 20 and may, at times, contact tips of the turbine blades. The wall 168 defines or includes attachment members 169a/169b, which serve to secure and mount the seal 103 to a case structure in the engine 20.

The non-gaspath side 103d, and in this example also the attachment members 169a/169b, define a cavity 174. The network 76 is embedded in the wall 168 between inner and outer portions 168a/168b of the wall 168. The inlet orifice 78 of the network 76 opens through the inner portion 168a to the cavity 174. Similar to the airfoil 60, bleed air from the compressor section 24 can be provided to the cavity 174 to provide cooling air through the inlet orifice 78 into the network 76.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A gas turbine engine article comprising:
   an article wall defining a cavity; and
   a cooling passage network embedded in the article wall between inner and outer portions of the article wall, the cooling passage network having an inlet orifice through the inner portion of the article wall to receive cooling air from the cavity, a sub-passage region including an array of pedestals, and at least one outlet orifice through the outer portion,
   the outer portion of the article wall having a protrusion in the cooling passage network facing toward the inlet orifice and at least one trip strip flanking the protrusion in the cooling passage network, the protrusion defining a protrusion height, the at least one trip strip defining a trip strip height, and the protrusion height being greater than the trip strip height.

2. The gas turbine engine article as recited in claim 1, wherein the protrusion is conical.

3. The gas turbine engine article as recited in claim 1, wherein the inlet orifice defines an orifice central axis and the protrusion defines a protrusion central axis, and the orifice central axis and the protrusion central axis are coaxial.

4. The gas turbine engine article as recited in claim 1, wherein the inlet orifice defines a minimum cross-sectional area and there is a bypass flow area defined between the inlet orifice and the protrusion, the bypass flow area being greater than the cross-sectional area of the inlet orifice.

5. The gas turbine engine article as recited in claim 1, wherein the protrusion defines a protrusion central axis and includes an impingement surface that is sloped with respect to a central axis of the inlet orifice.

6. The gas turbine engine article as recited in claim 1, wherein the at least one trip strip has a bowed shape.

7. The gas turbine engine article as recited in claim 6, wherein the bowed shape follows a periphery of the protrusion such that there is a uniform trench there between.

8. The gas turbine as recited in claim 1, wherein the protrusion height is greater than the trip strip height by at least 110%.

9. The gas turbine as recited in claim 1, wherein the protrusion height is greater than the trip strip height by more than 150%.

10. An airfoil comprising:
    an airfoil wall defining leading and trailing ends and first and second sides joining the leading and trailing ends, the airfoil wall circumscribing an internal core cavity; and
    a cooling passage network embedded in the airfoil wall between inner and outer portions of the airfoil wall, the cooling passage network having an inlet orifice through the inner portion of the airfoil wall to receive a flow cooling air from the internal core cavity, a manifold region into which the inlet orifice opens, a sub-passage region including an array of pedestals downstream of the manifold region, and at least one outlet orifice through the outer portion downstream of the sub-passage region,
    the outer portion of the airfoil wall having a flow splitter configured to fan the flow of cooling air from the inlet orifice into the manifold region, wherein the flow splitter is a protrusion on the outer portion of the airfoil wall in the cooling passage network, the outer portion of the airfoil wall having at least one trip strip flanking the protrusion, the protrusion defining a protrusion height, the at least one trip strip defining a trip strip height, and the protrusion height being greater than the trip strip height.

11. The airfoil as recited in claim 10, wherein the flow splitter includes an impingement surface that is sloped with respect to a central axis of the inlet orifice.

12. The airfoil as recited in claim 10, wherein the flow splitter is configured to fan the flow of cooling air over a 360° swath.

13. The airfoil as recited in claim 10, wherein the flow splitter is faceted.

14. The airfoil as recited in claim 10, wherein the flow splitter is configured to fan a portion of the flow of cooling air in an axially forward direction toward the leading end.

15. A gas turbine engine comprising:
    a compressor section;
    a combustor in fluid communication with the compressor section; and
    a turbine section in fluid communication with the combustor,
    the turbine section having a gas turbine engine article that includes
    an article wall defining a cavity, and
    a cooling passage network embedded in the article wall between inner and outer portions of the article wall, the cooling passage network having an inlet orifice through the inner portion of the airfoil wall to receive cooling air from the cavity, a sub-passage region including an array of pedestals, and at least one outlet orifice through the outer portion,
    the outer portion of the article wall having a protrusion in the cooling passage network facing toward the inlet orifice and at least one trip strip flanking the protrusion in the cooling passage network, the protrusion defining a protrusion height, the at least one trip strip defining a trip strip height, and the protrusion height being greater than the trip strip height.

16. The gas turbine engine as recited in claim 15, wherein the protrusion is conical.

17. The gas turbine engine as recited in claim 15, wherein the inlet orifice defines an orifice central axis and the protrusion defines a protrusion central axis, and the orifice central axis and the protrusion central axis are coaxial.

18. The gas turbine engine as recited in claim 15, wherein the inlet orifice defines a minimum cross-sectional area and there is a bypass flow area defined between the inlet orifice and the protrusion, the bypass flow area being greater than the cross-sectional area of the inlet orifice.

* * * * *